US012385301B2

(12) United States Patent
Voss

(10) Patent No.: US 12,385,301 B2
(45) Date of Patent: Aug. 12, 2025

(54) HINGE

(71) Applicant: RSI North America, Inc., Fort Worth, TX (US)

(72) Inventor: Michael Voss, Aledo, TX (US)

(73) Assignee: RSI North America, Inc., Fort Worth, TX (US)

( * ) Notice: Subject to any disclaimer, the term of this patent is extended or adjusted under 35 U.S.C. 154(b) by 0 days.

(21) Appl. No.: 18/239,554

(22) Filed: Aug. 29, 2023

(65) Prior Publication Data

US 2024/0076919 A1 Mar. 7, 2024

Related U.S. Application Data

(60) Provisional application No. 63/402,788, filed on Aug. 31, 2022.

(51) Int. Cl.
*E05D 5/06* (2006.01)
*E05D 3/02* (2006.01)

(52) U.S. Cl.
CPC ................. *E05D 5/06* (2013.01); *E05D 3/02* (2013.01); *E05Y 2600/51* (2013.01); *E05Y 2900/132* (2013.01)

(58) Field of Classification Search
CPC ................ E05D 3/02; E05D 2003/025; E05D 2003/027; E05D 5/02; E05D 5/0207; E05D 5/06; E05D 5/062; E05D 5/065; E05D 11/06; E05Y 2900/132; E05Y 2600/51
See application file for complete search history.

(56) References Cited

U.S. PATENT DOCUMENTS 1,368,127 A * 2/1921 Ellison .................... E05D 15/30 16/361
1,715,590 A * 6/1929 Burhenne ............... E05F 11/00 292/228
2,032,630 A * 3/1936 Northup ..................... B60J 1/04 16/387
4,807,331 A * 2/1989 Calucci ................. E05D 7/1005 16/382
5,632,064 A * 5/1997 Lautenschlager ......... E05D 5/08 16/382
6,070,294 A * 6/2000 Perkins ............... E05D 11/0054 16/334
6,766,561 B1 * 7/2004 Cheng ..................... E05D 11/00 16/382
6,836,933 B2 * 1/2005 Janczak .................... E05D 9/00 16/221

(Continued)

FOREIGN PATENT DOCUMENTS

AU D201913692 8/2019
AU D202011930 5/2020

(Continued)

*Primary Examiner* — Jeffrey O'Brien
(74) *Attorney, Agent, or Firm* — K&L Gates LLP

(57) ABSTRACT

A hinge includes a stainless steel pin rotatably connecting a glass filled nylon base section and a glass filled nylon rotating section by extending through a first lateral aperture of the glass filled nylon base section, a second lateral aperture of the glass filled nylon rotating section, and a third lateral aperture of the glass filled nylon base section. The glass filled nylon base section includes a right portion and a left portion fixed by a cross bar.

3 Claims, 12 Drawing Sheets

(56) References Cited

U.S. PATENT DOCUMENTS

| | | | | |
|---|---|---|---|---|
| 6,892,425 | B2 * | 5/2005 | Smith | B05B 13/0292 16/374 |
| 7,735,195 | B2 * | 6/2010 | Brown | E05D 11/1042 16/335 |
| 8,505,164 | B2 * | 8/2013 | Katou | E05D 9/00 16/386 |
| 8,925,258 | B1 * | 1/2015 | Header | E05D 15/00 52/767 |
| 8,928,477 | B2 * | 1/2015 | Herglotz | H04B 5/70 340/545.1 |
| 10,669,759 | B2 * | 6/2020 | Lu | E05D 7/0054 |
| D924,037 | S * | 7/2021 | Suh | D8/323 |
| 11,280,125 | B1 * | 3/2022 | Christie | B65F 1/1623 |
| 11,313,162 | B2 * | 4/2022 | Olkay | E05D 7/1061 |
| D964,250 | S * | 9/2022 | Voss | D12/401 |
| D964,253 | S | 9/2022 | Voss | |
| 11,702,873 | B2 * | 7/2023 | Robert-Beaudoin | E05D 3/18 16/221 |
| 11,795,747 | B2 * | 10/2023 | Rojas | E05D 11/1085 |
| 2006/0059658 | A1 * | 3/2006 | Ahlfs | E05D 11/06 16/306 |
| 2006/0213032 | A1 * | 9/2006 | Yang | F16M 11/10 16/340 |
| 2008/0127565 | A1 * | 6/2008 | Taylor | E05D 7/04 49/394 |
| 2009/0007376 | A1 * | 1/2009 | Lin | G06F 1/1616 16/350 |
| 2011/0289727 | A1 * | 12/2011 | Le | E05D 11/081 16/273 |
| 2013/0014345 | A1 * | 1/2013 | Park | E05D 5/06 16/248 |
| 2015/0267451 | A1 * | 9/2015 | Hirai | E05D 3/02 16/279 |
| 2016/0025121 | A1 * | 1/2016 | Ahnert | F16B 2/185 403/373 |
| 2017/0247920 | A1 * | 8/2017 | Dolman | E05D 7/04 |
| 2017/0268269 | A1 * | 9/2017 | Nicholas, III | E05D 7/1055 |
| 2020/0032565 | A1 * | 1/2020 | Culp | E05D 5/023 |
| 2020/0270921 | A1 * | 8/2020 | Fink | E05D 7/1061 |
| 2020/0284077 | A1 * | 9/2020 | Börjesson | B62D 65/024 |
| 2020/0362504 | A1 * | 11/2020 | Li | E05D 11/0081 |
| 2020/0391828 | A1 * | 12/2020 | Mcguinness | B63B 27/14 |
| 2022/0042362 | A1 * | 2/2022 | Freedman | E05D 5/12 |
| 2022/0106819 | A1 * | 4/2022 | Zeitler | E05D 3/02 |
| 2022/0120125 | A1 * | 4/2022 | Lenze | E05D 7/0423 |
| 2022/0145680 | A1 * | 5/2022 | Na | E05F 3/20 |
| 2024/0076919 | A1 * | 3/2024 | Voss | E05D 3/02 |
| 2024/0151085 | A1 * | 5/2024 | Lin | E05D 11/1028 |
| 2024/0240502 | A1 * | 7/2024 | Li | E05F 7/06 |

FOREIGN PATENT DOCUMENTS

| | | | | |
|---|---|---|---|---|
| CA | 2320103 | A1 * | 6/2000 | |
| TW | 812536 | B1 * | 8/2023 | E05D 11/08 |
| WO | WO-2013016778 | A1 * | 2/2013 | F16B 39/12 |
| ZA | F2019/00003 | | 9/2020 | |
| ZA | F2019/00004 | | 10/2020 | |

* cited by examiner

HINGE

CROSS-REFERENCE TO RELATED APPLICATIONS

The present application claims the benefit of U.S. Provisional Patent Application No. 63/402,788 filed Aug. 31, 2022, the entirety of which is incorporated herein by reference.

BACKGROUND

The present disclosure generally relates to a hinge. Typically, a hinge is a mechanical device that rotatably connects two objects. A door hinge is one specific application of a hinge. Generally, a door hinge connects a door to the door frame, whereby the door is capable of rotating about an axis defined by the hinge that is perpendicular to the ground. The components and the structure of a hinge can be modified to fit various applications.

SUMMARY

The present disclosure provides a new and innovative system, methods and apparatus for a hinge. In an example, a hinge includes a stainless steel pin rotatably connecting a glass filled nylon base section and a glass filled nylon rotating section by extending through a first lateral aperture of the glass filled nylon base section, a second lateral aperture of the glass filled nylon rotating section, and a third lateral aperture of the glass filled nylon base section. The glass filled nylon base section includes a right portion and a left portion fixed by a cross bar.

In another example, the stainless steel pin defines a first axis, and the right portion and the left portion define a first plane. Further, the right portion comprises a fourth aperture and the left portion comprises a fifth aperture. Additionally, a third axis defined by the fourth aperture is parallel to a fourth axis defined by the fifth aperture. The third axis and the fourth axis are substantially perpendicular to the first axis.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1A:
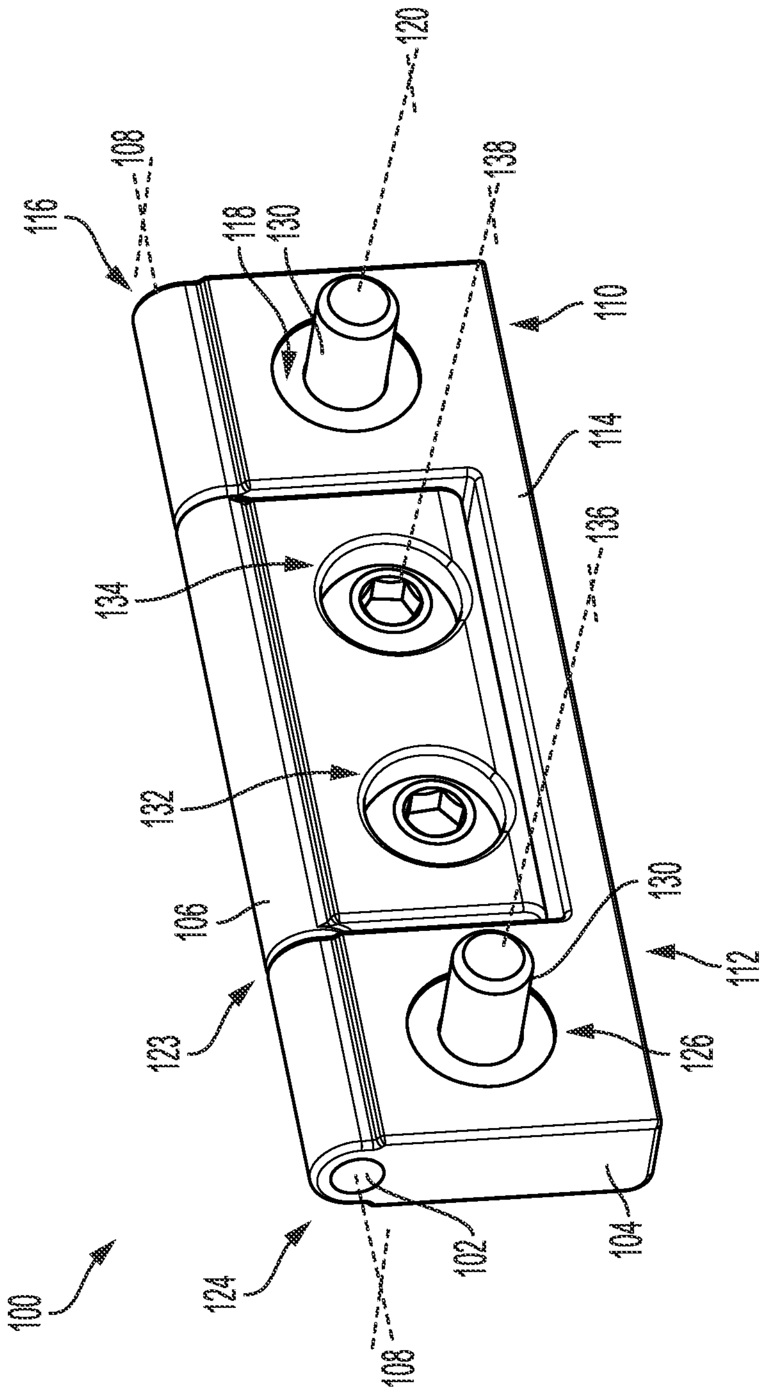
FIGS. 1A-1B are a hinge, according to various examples of the present disclosure.
Figure 1B:
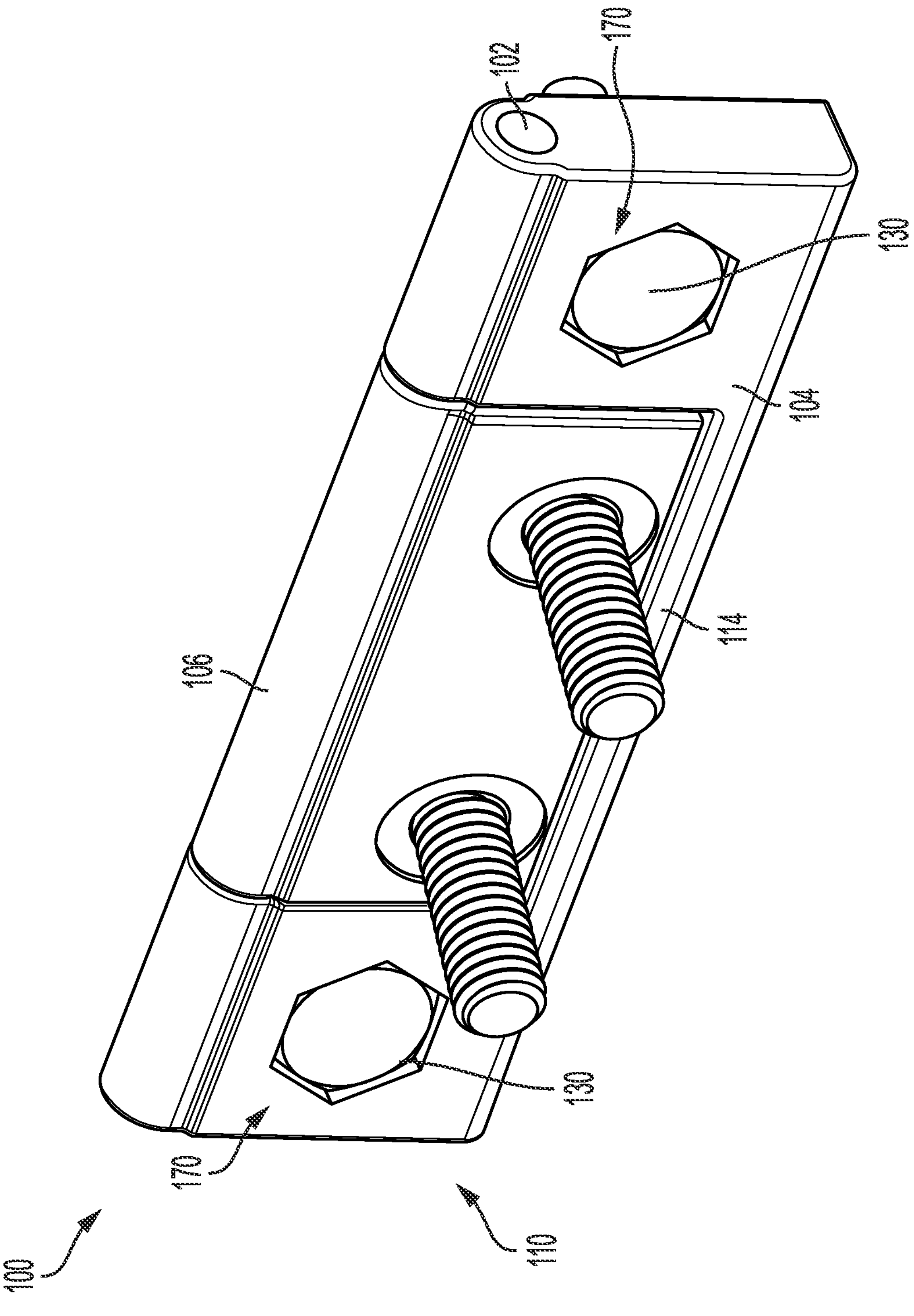

FIGS. 1A and 1B illustrate perspective views of a hinge, according to various examples of the present disclosure. The hinge 100 includes a stainless steel pin 102, a glass filled nylon base section 104, and a glass filled nylon rotating section 106. The stainless steel pin 102 defines a first axis 108. The glass filled nylon base section 104 includes a right portion 110 and a left portion 112 fixed by a cross bar 114. The right portion 110 and the left portion 112 define a first plane. The right portion 110 includes a first lateral aperture 116 and a fourth aperture 118 defining a third axis 120. The glass filled nylon rotating section 106 includes a second lateral aperture 123. The left portion 112 includes a third lateral aperture 124 and a fifth aperture 126 defining a fourth axis 136. A plurality of bolts 130 engage the fourth aperture 118 and the fifth aperture 126 to connect the glass filled nylon base section 104 to an anchor surface. The plurality of bolts 130 may be any number of bolts. In an example, as shown in FIG. 1B, the plurality of bolts 130 are hex head bolts. Thus, during installation the hex head of the plurality of bolts 130 engage a respective hexagonal, complementary aperture 170. When the plurality of bolts 130 engage their respective apertures 170, the plurality of bolts 130 cannot be rotated, which allows a user to securely fasten a nut, for example, on the end of each bolt 130 without having to manually secure the bolt 130 from the opposite side. In FIG. 1A, the stainless steel pin 102 rotatably connects the glass filled nylon base section 104 and the glass filled nylon rotating section 106. Namely, the stainless steel pin 102 extends through the first lateral aperture 116, the second lateral aperture 123, and the third lateral aperture 124 such that the glass filled nylon rotating section 106 rotates about the first axis 108.

The glass filled nylon rotating section 106 of the hinge 100, as depicted in FIG. 1A, is in the closed position. In the closed position, the glass filled nylon rotating section 106 is located between the right portion 110 and the left portion 112 of the glass filled nylon base section 104. The glass filled nylon rotating section 106 has a sixth aperture 134 and a seventh aperture 132. Further, in the closed position, the sixth aperture 134 defines a fifth axis 138, which is parallel to the fourth axis 136 and the third axis 120. To transition to the open position, the glass filled nylon rotating section 106 rotates about the first axis 108 defined by the stainless steel pin 102. Further, the stainless steel pin 102, the glass filled nylon base section 104, and the glass filled nylon rotating section 106 may be resistant to corrosion. In an example, hinges can be made from various materials, one of which is aluminum. Overtime, when exposed to the elements in an outdoor environment, aluminum may corrode, thereby preventing a hinge from properly rotating. In contrast, FIG. 1 depicts a hinge 100 including a glass filled nylon base section 104 and a glass filled nylon rotating section 106 connected by a stainless steel pin 102. Glass filled nylon and stainless steel may prevent the hinge 100 from corroding over time, which may increase the lifetime of the hinge.

Figure 2A:
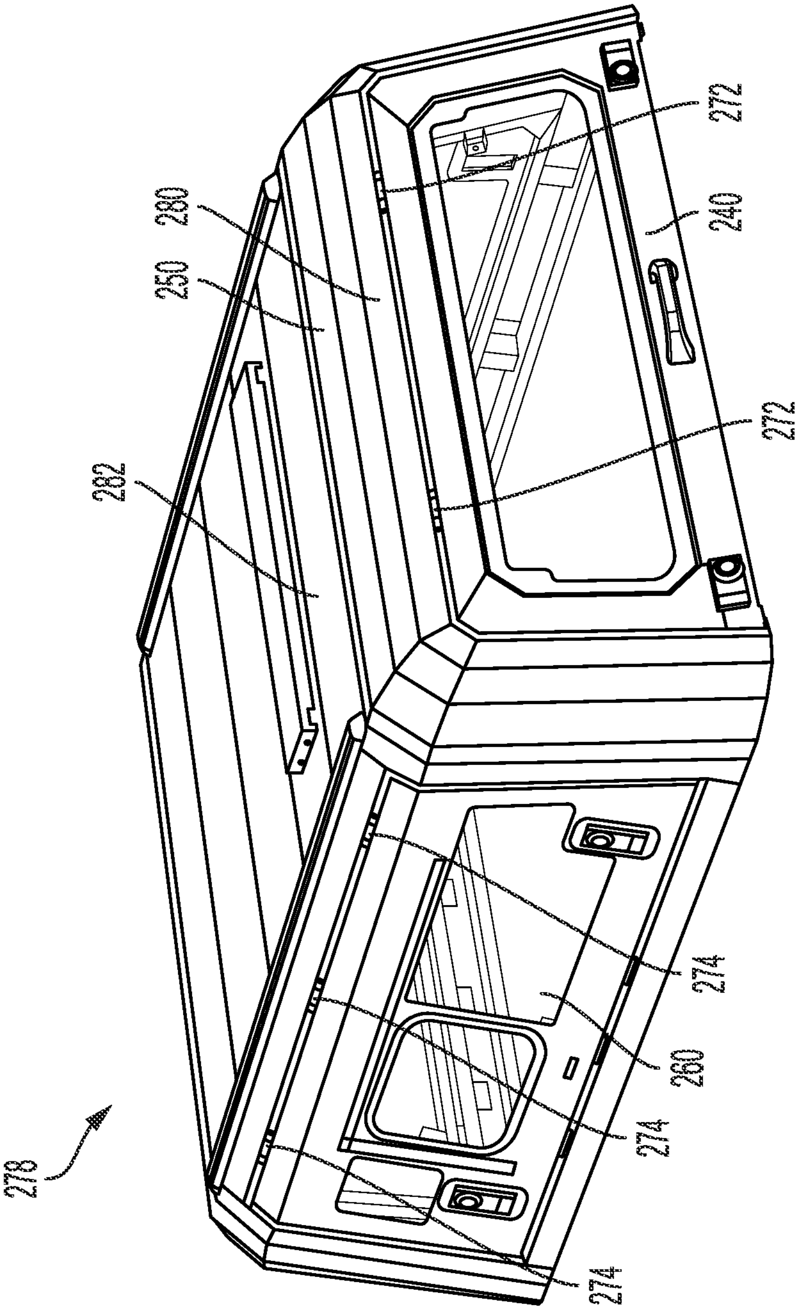
FIGS. 2A-2C are a hinge, according to various examples of the present disclosure, applied to a rear door in the closed position.
Figure 2B:
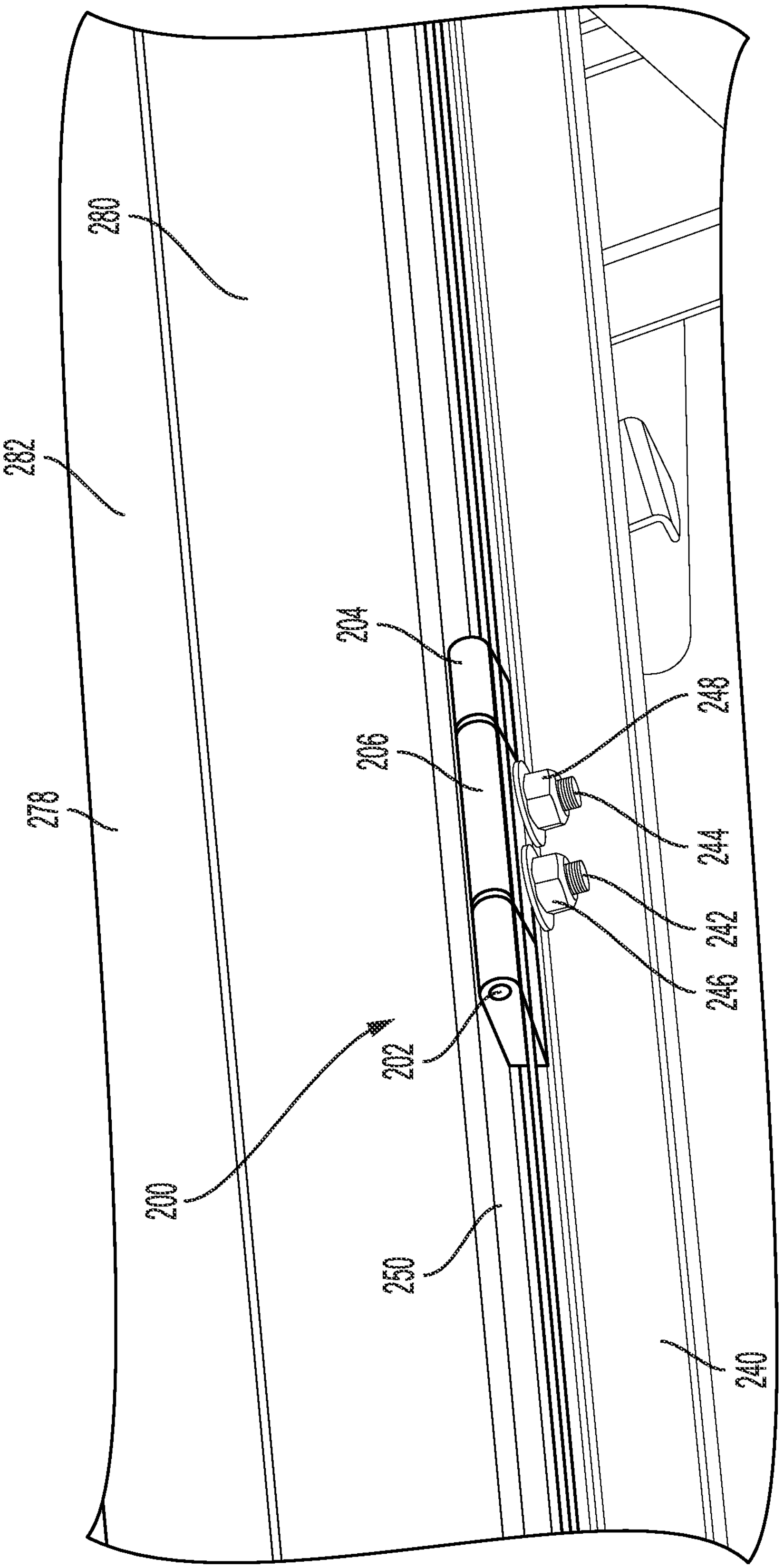

FIG. 2A is a rear door hinge and a side door hinge, according to various examples of the present disclosure, applied to a vehicle canopy in the closed position. The rear door hinges 272 allows a user to rotate the rear door 240 to an open position. The side door hinges 274 allow a user to rotate the side door 260 to an opened position. In an example embodiment, the vehicle canopy 278 may include mechanical components that fix the rear door 240 and the side door 260 in the open position. FIG. 2B is an exploded view of a hinge from FIG. 2A (e.g., rear door hinge), according to various examples of the present disclosure, applied to a rear door in the closed position. To effectively show the hinge 200 in the closed position, the rear door 240 (shown in FIG. 2A) is transparent in FIG. 2B. The hinge 200 includes the stainless steel pin 202, the glass filled nylon base section 204, and the glass filled nylon rotating section 206. As depicted in FIG. 2B, the glass filled nylon base section 204 abuts and is mounted to an anchor surface 250. In an example, the anchor surface 250 can be a frame of the vehicle canopy 278. In FIG. 2B, a first button head bolt 242 and a second button head bolt 244 extend through the glass filled nylon rotating section 206 and through a rear door 240 to engage a first nyloc nut 246 and a second nyloc nut 248, respectively. Therefore, the first button head bolt 242 and the second button head bolt 244 connect the glass filled nylon rotating section 206 to the rear door 240. In an example, a user rotates the rear door 240, which rotates the glass filled nylon rotating section 206 about the stainless steel pin 202.

The hinge 200 may be used in various applications. In an example, the hinge 200 may rotatably connect a door or panel to a number of anchor surfaces. Some examples may include the use of the hinge 200 to connect a panel to a vehicle frame, a door to a door frame, or a gate to a fence. Further, the hinge 200 may be used on any suitable material or combination of materials. Examples may include various metals, wood, glass, plastic, or composite.

Before using the hinge 200, a user may be required to manually install the hinge 200 for their desired application. In an example, the user may use the hinge 200 to secure a rear door 240 to the anchor surface 250. In FIG. 2B, the anchor surface 250 is the frame of a vehicle canopy 278. The anchor surface 250 includes a lip portion 280 and a roof portion 282. However, in a number of applications, a user may have limited space for installing a typical hinge. For example, as shown in FIG. 2A, the entire anchor surface 250 and the rear door 240 are not completely coplanar. Instead, the anchor surface 250 is substantially coplanar for a small length, for example, 1 to 2 inches with the lip portion 280. After the lip portion 280, the anchor surface 250 is angled. In FIG. 2A, the rear door 240 and the roof portion 282 of the anchor surface 250 may define an angle that is closer to 90 degrees, and less than 135 degrees. Thus, when installing a typical hinge on the rear door 240 and the anchor surface 250, a user would be constrained in the amount of overhead space available. For example, a user at an interior side of the vehicle canopy 278 may need to secure the plurality of bolts that extend through rear door 240, through the hinge 272 with a nut between the roof portion 282 and the hinge 272 causing space constraints. Further, a space constrained environment in the installation process may cause assembly issues or increase assembly costs.

Figure 2C:
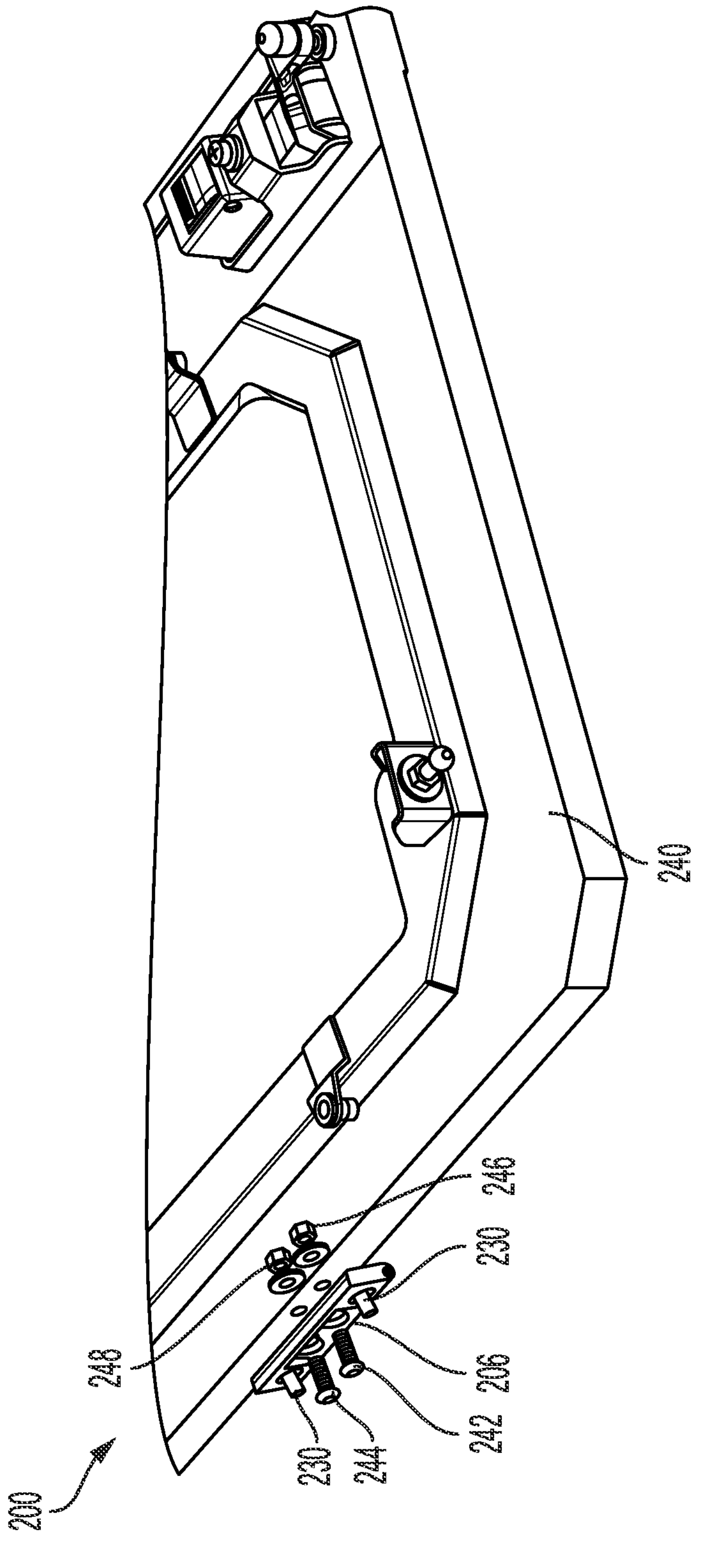

As shown in FIGS. 2B and 2C, by using the first button head bolt 242 and the second button head bolt 244, a user may assemble the hinge 200 from one side. For example, a user may partially assembly the hinge 200 with the stainless steel pin 202, the glass filled nylon base section 204, and the glass filled nylon rotating section 206. First, a user may extend the first button head bolt 242 and the second button head bolt 244 through the glass filled nylon rotating section 206. Then, a user may advantageously secure the hinge 200 to the rear door 240 by locking the first button head bolt 242 and the second button head bolt 244 into place with the first nyloc nut 246 and a second nyloc nut 248, respectively. Thus, the hinge 200 will be secured to the rear door 240. The hinge 200 and rear door 240 combination can then be attached to the anchor surface 250. Namely, the bolts that extend through the glass filled nylon base section 204 may extend through the anchor surface 250. The user then can complete the assembly process on a single side of the hinge 200 in the overhead space by securing the bolts 230 to the anchor surface 240 with a first and second nut (not illustrated). The following single side installation of the hinge 200 may be preferred over securing the hinge 200 from multiple sides in a space constrained environment where the rear door 240 extends, after a few inches (or less) of overhead space, away from the anchor surface 250, not at approximately 180 degrees, but rather, at closer to 90 degrees. Thus, the connection of the first button head bolt 242 and the second button head bolt 244 to the rear door 240 before the connection to the anchor surface 250 may provide an efficient assembly process by advantageously enabling final tightening or securing of the nuts (not illustrated) on bolts 230 and button head bolts 242, 244 in constrained space all from one side of the hinge 200 without any manipulation of components on the other side of the hinge 200.

Figure 3A:
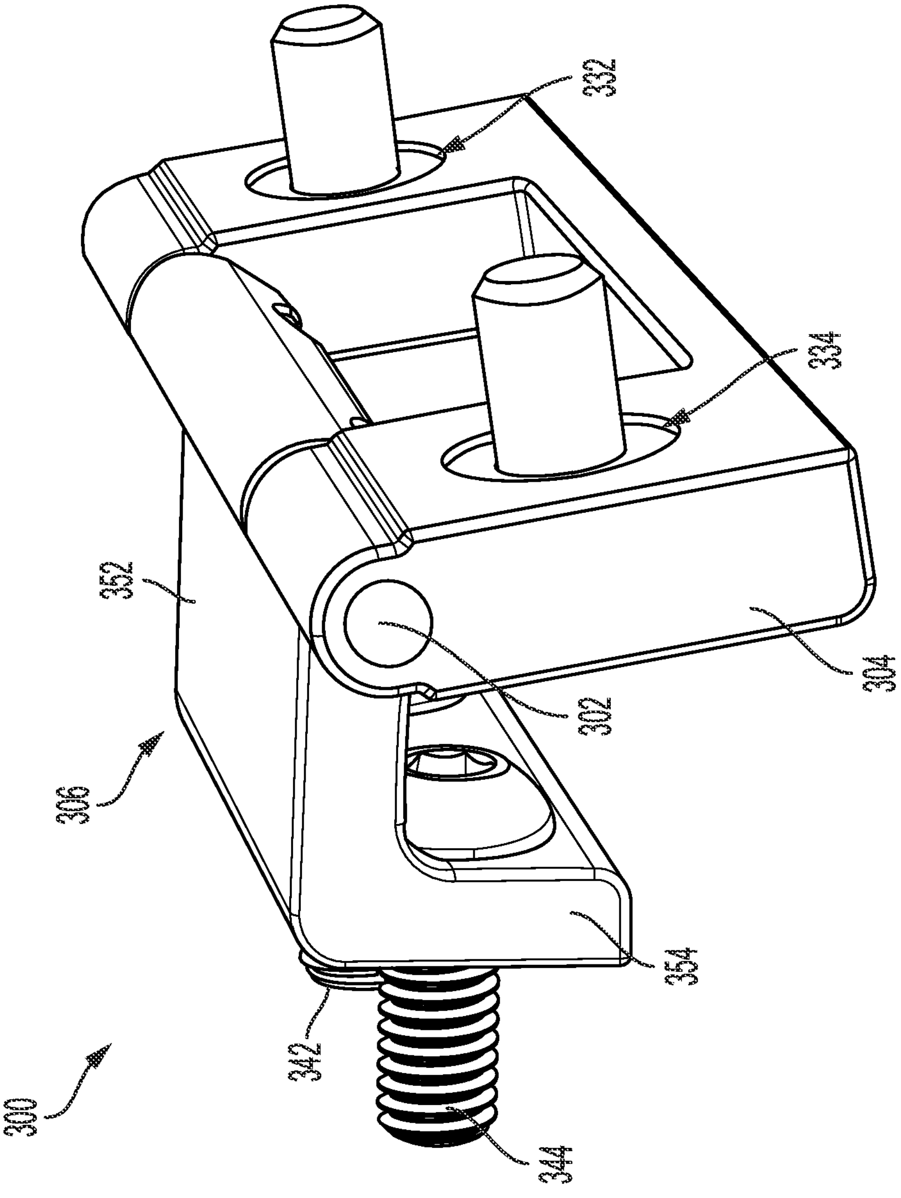
FIGS. 3A-3B are a hinge, according to various examples of the present disclosure.
Figure 3B:
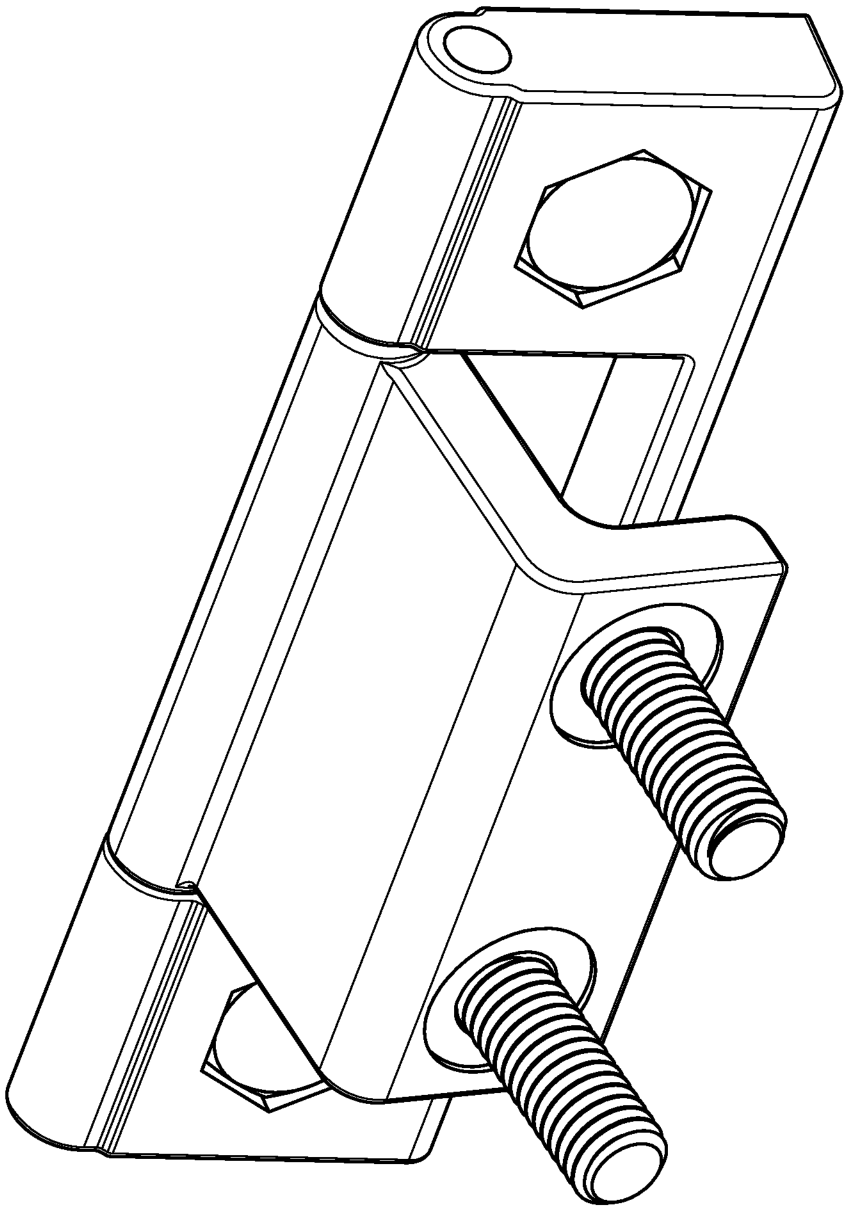

FIG. 3A is a hinge, according to various examples of the present disclosure. The hinge 300 includes a stainless steel pin 302, a glass filled nylon base section 304, and a glass filled nylon rotating section 306 having a sixth aperture 334 and a seventh aperture 332. The hinge 300 may share some of the same features as hinge 100 depicted in FIG. 1, and for ease of understanding, like terminology (e.g., numbering, reference numerals) may be used herein across various Figures in the present application. For example, the hinge 300 may include the same stainless steel pin 302 and the glass filled nylon rotating section 306. Further, the same stainless steel pin 302 may rotatably fix the glass filled nylon base section 304 and the glass filled nylon rotating as previously explained.

The glass filled nylon rotating section 306 may further include a first portion 352 and a second portion 354. The first portion 352 and the second portion 354 meet at an approximately 90 degree angle. In another example, the first portion 352 and the second portion 354 may meet at a number of angles for the specific application. Further, the first portion 352 defines a second plane and the second portion 354 defines a third plane. The hinge 300 may be used to rotatably connect an anchor surface to a side door.

Figure 4A:
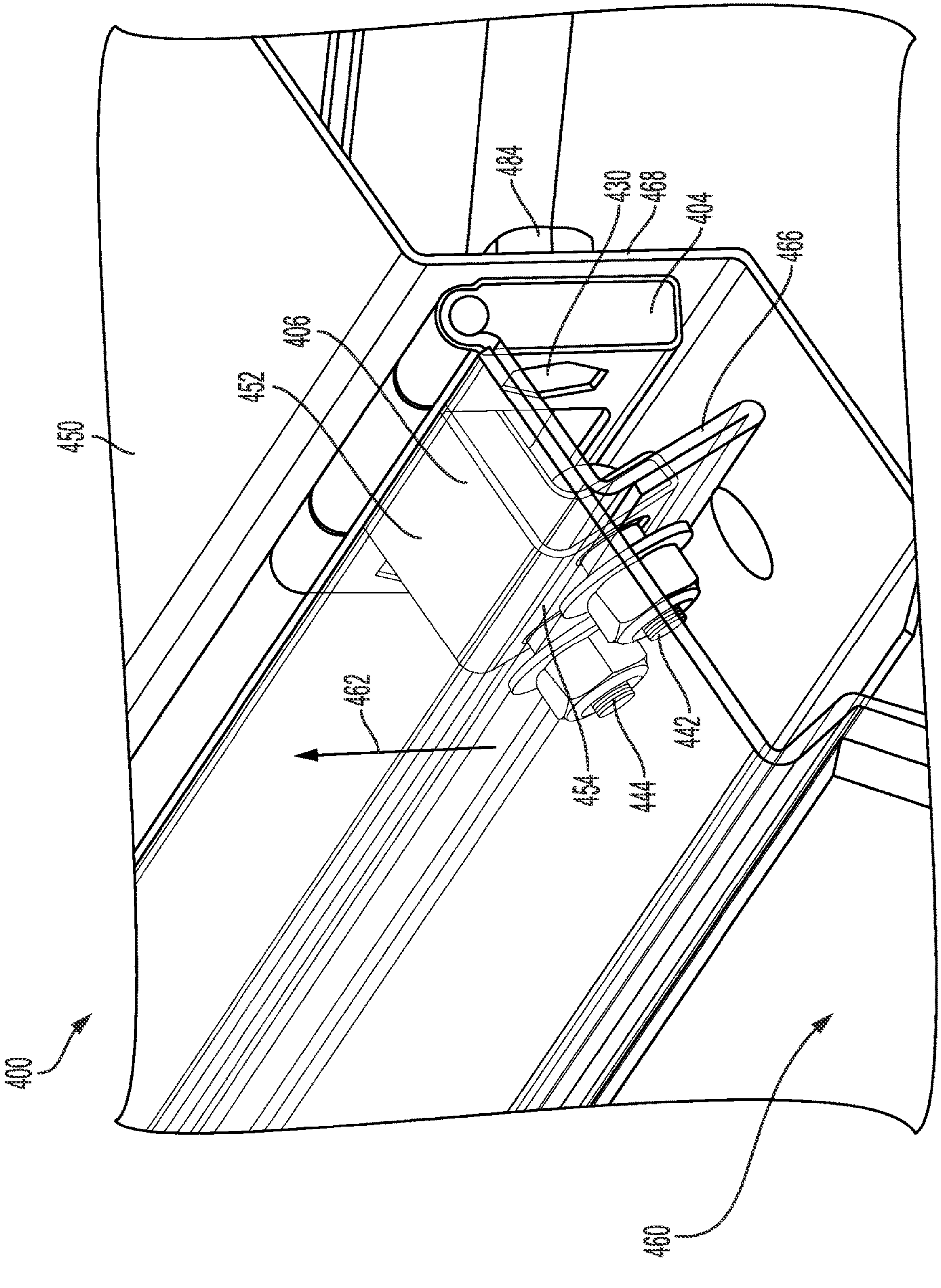
FIGS. 4A-B are a hinge, according to various examples of the present disclosure, applied to a side door in the closed position.

For example, in FIG. 4A, an anchor surface may be a frame of a vehicle canopy and the side door 460 may be a side panel that rotates upward, thereby creating an open window on the vehicle canopy (e.g., as in FIG. 2A). In the closed position, the hinge 400 can connect a side door 460 to a vehicle canopy frame where the connection point 466 of the side door 460 and the vehicle canopy frame 468 are not coplanar. Rather, the connection point 466 of the side door 460 and the vehicle canopy frame 468 would meet, if extended, at an acute angle. The hinge 400 includes the first portion 452 and the second portion 454 to accommodate the connection point 466 of the side door 460 and the vehicle canopy frame 468. In an example, the glass filled nylon base section 404 abuts and mounts to the vehicle canopy frame 468 substantially perpendicular to the ground. The first portion 452 of the glass filled nylon rotating section 406 extends from the glass filled nylon base section 404. The second portion 454 of the glass filled nylon rotating section 406 extends from the first portion 452 in an approximately 90 degree angle such that the first button head bolt 442 and the second button head bolt 444 may extend through the second portion 454 and engage the side door 460 at a non-coplanar angle with the anchor surface.

In FIG. 4A, a third axis, a fourth axis, and a fifth axis analogously correspond to the third axis 120, the fourth axis 136, and the fifth axis 138 in FIG. 1A. The hinge 400 rotatably connects a side door 460 to an anchor surface 450. In the close position, a plane of the first portion 454 and a plane of the second section are diagonal and non-perpendicular to a plane of the glass filled nylon base section 404. Thus, the first portion 452, the second portion 454, and the glass filled nylon base section 404 do not share a plane in the closed position, and may not share any parallel planes. Further, the fifth axis 138 is not parallel to the third axis 120 or the fourth axis 136 in the closed position. To transition the hinge 400 to an opened position, a user may rotate that side door 460, thereby rotating the glass filled nylon rotating section 406 in the direction of arrow labeled 462.

Figure 4B:
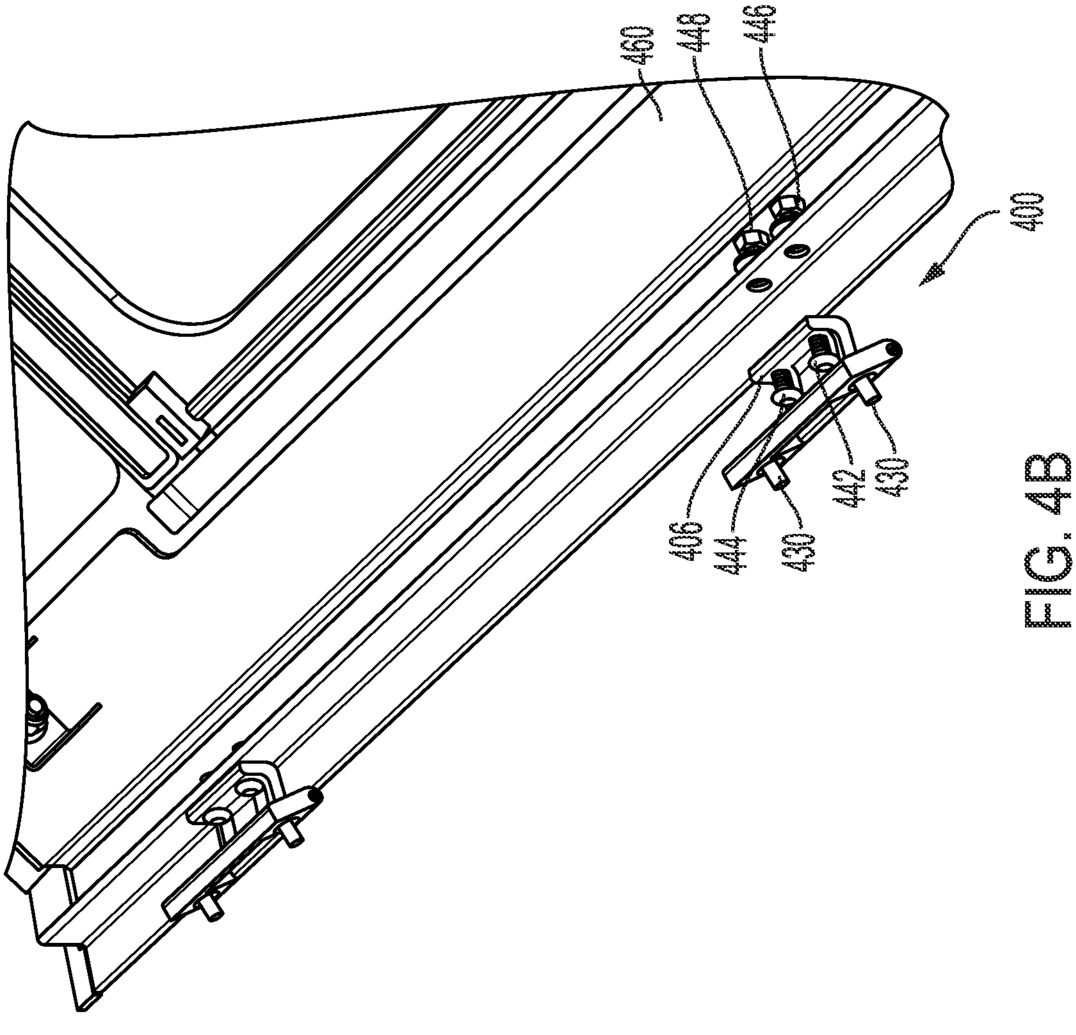

In an example, the user may use the hinge 400 to secure a side door 460 to the anchor surface 450. In FIG. 4A, the anchor surface 450 is the frame of a vehicle canopy. To address space constraints, the hinge 400 may be installed from a single side. Namely, in FIG. 4B, a user may first secure the hinge 400 to a side door 460. To secure the hinge 400 to the side door 460, a user may extend the first button head bolt 442 and the second button head bolt 444 through the glass filled nylon rotating section 406. Then, a user may advantageously secure the hinge 400 to the side door 460 by locking the first button head bolt 442 and the second button head bolt 444 into place with the first nyloc nut 446 and a second nyloc nut 448, respectively. Thus, the hinge 400 will be secured to the side door 460. The hinge 400 and rear door 460 combination can then be attached, in FIG. 4A, to the anchor surface 450 via the vehicle canopy frame 468. The user then can complete the assembly process on a single side of the hinge 400 in the overhead space by securing the bolts 430 to the anchor surface 450 with a first nut 484. Further, application of the first nut 484 would secure the hinge 400 to the anchor surface 450 because the complementary aperture of the hex head bolt prevents the bolt from rotating, allowing a user to tighten a first nut 484 without securing the opposite side of the bolt 430. The installation process provided may be advantageously for assembly and, based on the one sides installation, wrenches and other tools (e.g., Allen wrench) may be suitable for use.

Figure 5A:
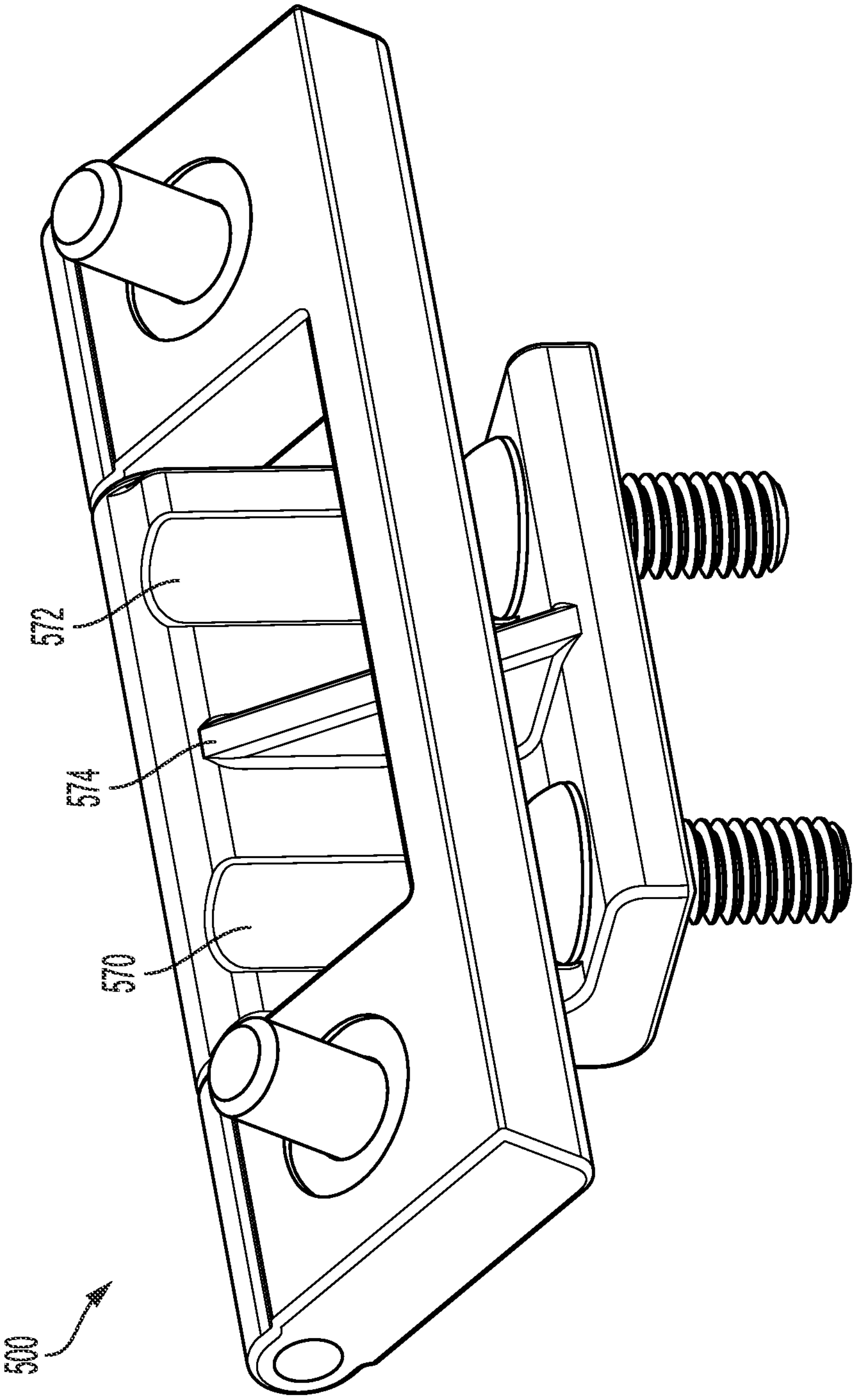
FIGS. 5A-C are a hinge, according to various examples of the present disclosure.
Figure 5B:
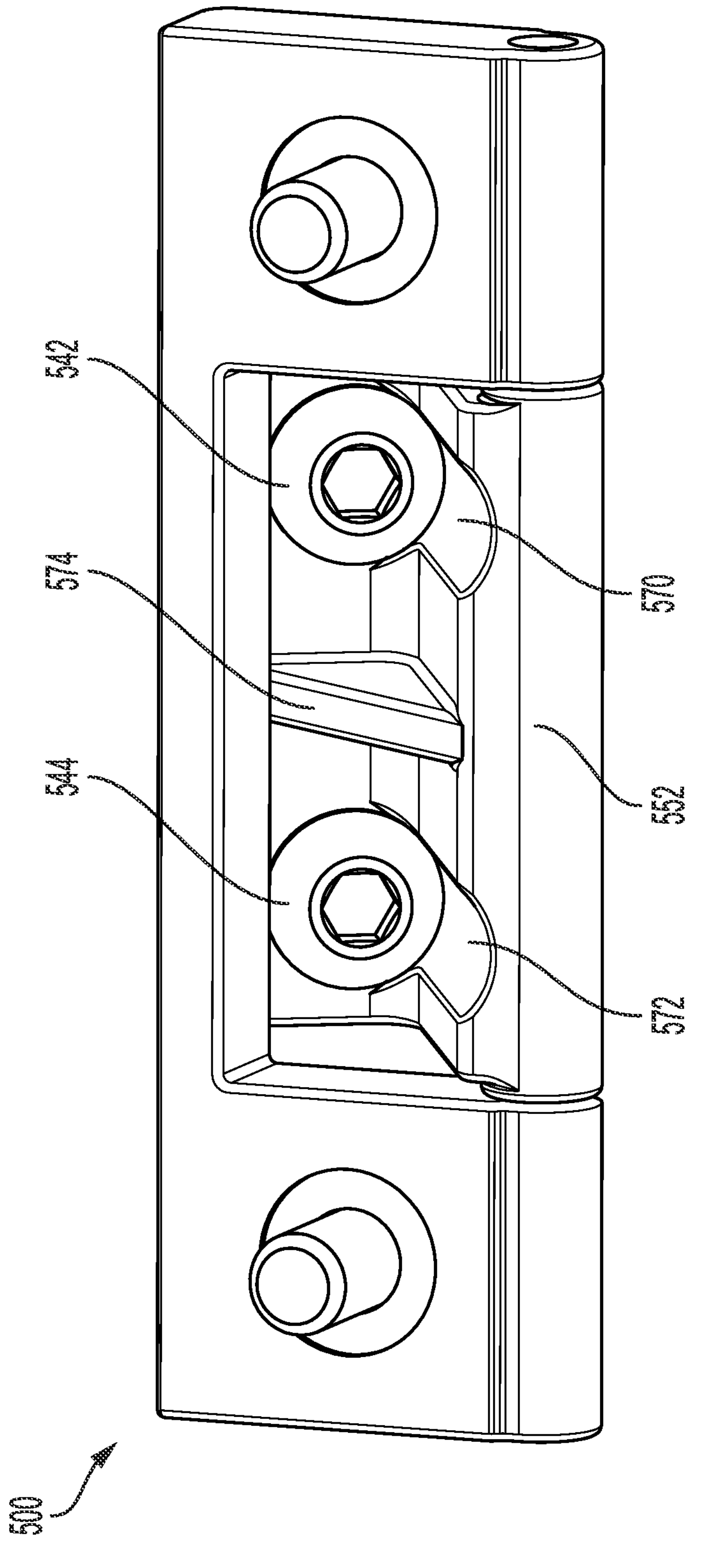
Figure 5C:
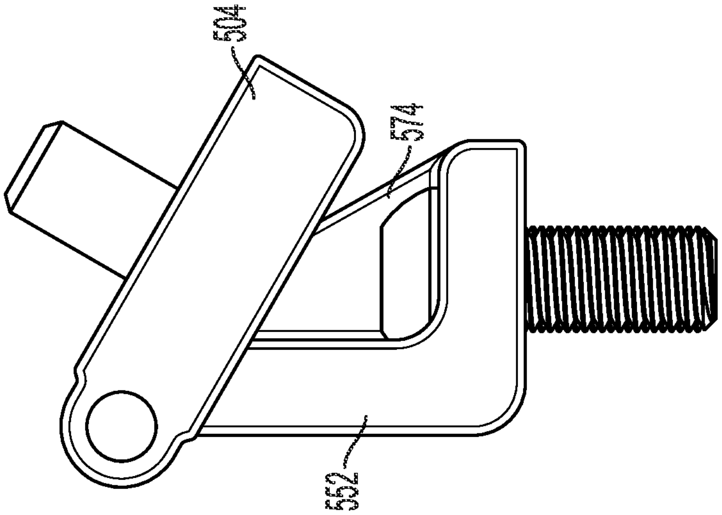

FIG. 5A is a perspective view of a hinge, according to various examples of the present disclosure. The hinge 500 includes a ridge 574. The ridge 574 acts as a support structure and may improve the rigidity and structural integrity of the hinge 500. The ridge 574 is also illustrated in FIG. 5B and FIG. 5C. Further, as shown in FIG. 5C, the glass filled nylon base section 504 will contact the ridge 574, thereby preventing over rotation beyond a desired closing position. The hinge 500 also includes a first notch 570 and a second notch 572. As shown in FIG. 5B, the first notch 570 and the second notch 572 are located on the first portion 552 of the hinge 500. By providing the first notch 570 and the second notch 572, the thickness of the first portion 552 can be increased while maintaining accessibility of the first button head bolt 542 and the second button head bolt 544. Similar to the ridge 574, the first notch 570 and the second notch 572 provides additional rigidity and structural integrity by increasing the thickness of the first portion 552 of the hinge 500.

Although the hinge has been described in certain specific aspects, many additional modifications and variations would be apparent to those skilled in the art. In particular, any of the various processes described above can be performed in alternative sequences and/or in parallel in order to achieve similar results in a manner that is more appropriate to the requirements of a specific application. It is therefore to be understood that the present disclosure can be practiced otherwise than specifically described without departing from the scope and spirit of the present embodiments. Thus, embodiments of the present disclosure should be considered in all respects as illustrative and not restrictive. It will be evident to the annotator skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled annotator, except where expressly required. Accordingly, the scope of the invention should be determined not by the embodiments illustrated, but by the appended claims and their equivalents.

The invention is claimed as follows:

1. A hinge comprising:

a stainless steel pin rotatably connecting a glass filled nylon base section and a glass filled nylon rotating section by extending through a first lateral aperture of the glass filled nylon base section, a second lateral aperture of the glass filled nylon rotating section, and a third lateral aperture of the glass filled nylon base section, wherein the glass filled nylon base section comprises a right portion and a left portion fixed by a cross bar, the right portion, the left portion, and the cross bar forming a first plane, wherein the rotating section comprises:

- a first portion and a second portion configured to meet at an approximately 90 degree angle, and
- a triangular support structure comprising a first edge contacting the first portion, a second edge contacting the second portion, and a third edge extending diagonally between the first portion and the second portion, the third edge configured to contact the cross bar of the glass filled nylon base section when the hinge is in a closed position.

2. The hinge of claim 1, wherein the first portion defines a second plane and the second portion defines a third plane, and wherein the second plane and the third plane are diagonal to the first plane in the closed position.

3. The hinge of claim 1, wherein the rotating section comprises a bolt aperture located on the second portion.

* * * * *